(12) United States Patent
Tang

(10) Patent No.: US 12,002,964 B2
(45) Date of Patent: Jun. 4, 2024

(54) ELECTROCHEMICAL DEVICE AND ELECTRONIC DEVICE

(71) Applicant: NINGDE AMPEREX TECHNOLOGY LIMITED, Ningde (CN)

(72) Inventor: Qiangqiang Tang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 35 days.

(21) Appl. No.: 17/698,320

(22) Filed: Mar. 18, 2022

(65) Prior Publication Data

US 2022/0311011 A1    Sep. 29, 2022

(30) Foreign Application Priority Data

Mar. 29, 2021 (CN) .......................... 202110334935.3

(51) Int. Cl.
  *H01M 4/66* (2006.01)
  *H01M 10/0525* (2010.01)
  (Continued)

(52) U.S. Cl.
  CPC ........... *H01M 4/667* (2013.01); *H01M 4/661* (2013.01); *H01M 4/663* (2013.01); *H01M 4/668* (2013.01);
  (Continued)

(58) Field of Classification Search
  CPC ...... H01M 4/667; H01M 4/661; H01M 4/663; H01M 4/668
  See application file for complete search history.

(56) References Cited

U.S. PATENT DOCUMENTS

| | | | |
|---|---|---|---|
| 2004/0234850 A1* | 11/2004 | Watarai | H01M 4/623 252/182.1 |
| 2013/0071755 A1* | 3/2013 | Oguro | H01M 4/0452 205/104 |

(Continued)

FOREIGN PATENT DOCUMENTS

| CN | 102130323 A | 7/2011 |
|---|---|---|
| CN | 106910897 A | 6/2017 |

(Continued)

OTHER PUBLICATIONS

Machine Translation of: WO 2014/112619 A, Ezura et al., Jul. 24, 2014.*

(Continued)

*Primary Examiner* — Kenneth J Douyette
(74) *Attorney, Agent, or Firm* — Maier & Maier, PLLC

(57) ABSTRACT

An electrochemical device includes a first electrode plate. The first electrode plate includes a current collector and an active material layer. The current collector includes a first substrate and a second substrate that are stacked together. The second substrate is disposed between the first substrate and the active material layer. And 100 MPa≤$Rm_1$−$Rm_2$≤400 MPa, $Rm_1$ is a tensile strength of the first substrate and $Rm_2$ is a tensile strength of the second substrate. The current collector that includes the first substrate and the second substrate is adopted, thereby suppressing both the elongation deformation of the electrode plate and the detachment of the active material layer.

20 Claims, 3 Drawing Sheets

(51) Int. Cl.
  *H01M 50/54* (2021.01)
  *H01M 4/02* (2006.01)
(52) U.S. Cl.
  CPC ....... *H01M 10/0525* (2013.01); *H01M 50/54* (2021.01); *H01M 2004/021* (2013.01); *H01M 2004/027* (2013.01)

(56) References Cited

U.S. PATENT DOCUMENTS

| | | | | |
|---|---|---|---|---|
| 2013/0078522 | A1* | 3/2013 | Yanagita | H01M 4/136 429/231.2 |
| 2014/0170452 | A1 | 6/2014 | Abe | |
| 2016/0181615 | A1* | 6/2016 | Van Duren | H01M 10/052 429/232 |
| 2019/0296390 | A1 | 9/2019 | Yoshima et al. | |

FOREIGN PATENT DOCUMENTS

| | | | | |
|---|---|---|---|---|
| CN | 109560285 | A | 4/2019 | |
| CN | 109873164 | A | 6/2019 | |
| CN | 109873166 | A | 6/2019 | |
| CN | 110660995 | A | 1/2020 | |
| CN | 110660998 | A | 1/2020 | |
| CN | 110943200 | A | 3/2020 | |
| CN | 110943224 | A | 3/2020 | |
| CN | 110943227 | A | 3/2020 | |
| CN | 111048787 | A | 4/2020 | |
| CN | 111180735 | A | 5/2020 | |
| CN | 111180736 | A | 5/2020 | |
| CN | 111682165 | A | 9/2020 | |
| CN | 111883778 | A | 11/2020 | |
| EP | 3522274 | A1 | 8/2019 | |
| JP | 2012-074337 | A | 4/2012 | |
| JP | 2012252961 | A | 12/2012 | |
| JP | 2013114825 | A | 6/2013 | |
| JP | 201422271 | A | 2/2014 | |
| WO | 2013080459 | A1 | 6/2013 | |
| WO | 2013115594 | A1 | 8/2013 | |
| WO | 2014112619 | A1 | 7/2014 | |
| WO | WO-2014112619 | A1 * | 7/2014 | ............... B32B 1/00 |
| WO | 2020238156 | A1 | 12/2020 | |

OTHER PUBLICATIONS

First Office Action dated Dec. 14, 2021, corresponding to Chinese Application No. 202110334935.3; 11 pages (with English Translation).
Office Action dated Aug. 16, 2022, in corresponding Indican Application No. 202224018300; 6 pages.
Notice of Allowance dated Mar. 21, 2022, in corresponding Chinese Application No. 202110334935.3; 4 pages.
Extended European Search Report dated Aug. 30, 2022, in corresponding European Application No. 22162921.5; 8 pages.
Office Action issued on Mar. 1, 2024, in corresponding Chinese Application No. 202210416788.9, 18 pages.
Office Action issued on Mar. 18, 2024, in corresponding Chinese Application No. 202210416933.3, 16 pages.
Office Action issued on Mar. 1, 2024, in corresponding Chinese Application No. 202210416934.8, 16 pages.

* cited by examiner

ELECTROCHEMICAL DEVICE AND ELECTRONIC DEVICE

CROSS-REFERENCE TO RELATED APPLICATIONS

This application claims priority to Chinese Patent Application No. 202110334935.3, filed on Mar. 29, 2021, the whole disclosure of which is incorporated herein by reference.

TECHNICAL FIELD

This application relates to the field of electrochemical energy storage, and in particular, to an electrochemical device and an electronic device.

BACKGROUND

Electrochemical devices (such as a lithium-ion battery) expand in volume during cycling. Especially, an active material layer in an electrode plate expands significantly during cycling. Consequently, a current collector in the electrode plate elongates and deforms in the X and Y directions in a plane coordinate system thereof. Further, the active material layer may be dislocated and peeled off from the current collector, thereby greatly affecting safety performance and cycle performance of the electrochemical devices.

SUMMARY

An embodiment of this application provides an electrochemical device. The electrochemical device includes a first electrode plate. The first electrode plate includes a current collector and an active material layer. The current collector includes a first substrate and a second substrate that are stacked together. The second substrate is disposed between the first substrate and the active material layer. And 100 MPa≤$Rm_1$−$Rm_2$≤400 MPa, $Rm_1$ is a tensile strength of the first substrate and $Rm_2$ is a tensile strength of the second substrate.

In some embodiments, a thickness $d_1$ of the first substrate and a thickness $d_2$ of the second substrate satisfy: 0.5≤$d_1$/$d_2$≤2.5. In some embodiments, 400 MPa≤$Rm_1$≤1000 MPa, and 1 MPa≤$Rm_2$≤600 MPa.

In some embodiments, the first substrate includes at least one of an alloy material, an inorganic ceramic material, a calendered copper foil, an electrodeposited nickel foil, or a calendered nickel foil. In some embodiments, the second substrate includes at least one of a porous copper foil, an electrodeposited copper foil, a foamed copper foil, or a conductive polymer material. In some embodiments, the conductive polymer material includes a conductive agent and a polymer material. In some embodiments, the conductive agent includes a carbon material. In some embodiments, the polymer material includes at least one of polyethylene, polypropylene, polystyrene, epoxy resin, or phenol resin.

In some embodiments, the current collector further includes a first bonding layer. The first bonding layer is disposed between the first substrate and the second substrate, and is configured to bond the first substrate and the second substrate.

In some embodiments, an elongation rate of the first substrate is less than or equal to 25%, and an elongation rate of the second substrate is less than or equal to 25%. In some embodiments, in a thickness direction of the first electrode plate, a projection of the active material layer is located within a region of a projection of the second substrate. In some embodiments, a total thickness of the first substrate and the second substrate is 4 μm to 20 μm. In some embodiments, the active material layer contacts the second substrate. In some embodiments, the first electrode plate further includes a conductive layer disposed between the active material layer and the second substrate. The conductive layer contacts both the active material layer and the second substrate.

In some embodiments, the active material layer includes a negative active material. The negative active material includes a silicon-based material. The silicon-based material includes at least one of silicon, a silicon alloy, an oxide of silicon, or a silicon-carbon composite.

In some embodiments, the current collector further includes a third substrate. The third substrate is stacked along with the first substrate. The first substrate is disposed between the third substrate and the second substrate. The active material layer is further disposed on the third substrate. And 100 MPa≤$Rm_1$−$Rm_3$≤400 MPa, $Rm_1$ is the tensile strength of the first substrate and $Rm_3$ is a tensile strength of the third substrate.

In some embodiments, the electrochemical device further includes a tab connected to the first substrate or the second substrate of the first electrode plate. A thickness of the first substrate or the second substrate connected to the tab is greater than or equal to 3 μm.

Another embodiment of this application provides an electronic device, including the electrochemical device.

In the embodiments of this application, the current collector that includes the first substrate and the second substrate is adopted. And 100 MPa≤$Rm_1$−$Rm_2$≤400 MPa, $Rm_1$ is a tensile strength of the first substrate and $Rm_2$ is a tensile strength of the second substrate. The second substrate with a relatively low tensile strength can alleviate the peel-off phenomenon of the active material layer, and the first substrate with a relatively high tensile strength can alleviate the elongation deformation of the first electrode plate. Therefore, the current collector according to this application can suppress both the elongation deformation of the electrode plate and the detachment of the active material layer.

DETAILED DESCRIPTION

The following embodiments enable a person skilled in the art to understand this application more comprehensively, but without limiting this application in any way.

An active material layer of an electrode plate of an electrochemical device expands in volume during cycling. Consequently, a current collector in the electrode plate elongates and deforms in the X and Y directions in a plane coordinate system thereof. Further, the active material layer may be dislocated and peeled off (that is, detached) from the current collector, thereby greatly affecting safety performance and cycle performance of the electrochemical device.

Figure 1:
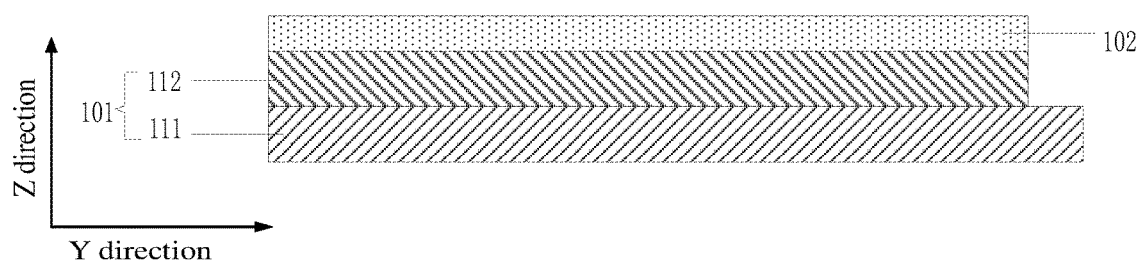
FIG. 1 is a schematic diagram of a first electrode plate sectioned along a plane defined by a thickness (Z) direction and a width (Y) direction of a current collector according to some embodiments of this application.

To solve the foregoing problem, an embodiment of this application discloses an electrochemical device. The electrochemical device includes a first electrode plate. In some embodiments, the first electrode plate may be a positive or negative electrode plate. In some embodiments, as shown in FIG. 1, the first electrode plate 10 includes a current collector 101 and an active material layer 102. In some embodiments, the current collector 101 includes a first substrate 111 and a second substrate 112 that are stacked together. In some embodiments, the second substrate 112 is at least partly disposed between the first substrate 111 and the active material layer 102. Understandably, although the active material layer 102 shown in FIG. 1 fully overlays the second substrate 112, the drawing is merely exemplary but not intended as a limitation. The active material layer 102 may just partly overlay the second substrate 112. In addition, the second substrate 112 may partly overlay the first substrate 111.

In some embodiments, 100 MPa≤$Rm_1$−$Rm_2$≤400 MPa, $Rm_1$ is a tensile strength of the first substrate and $Rm_2$ is a tensile strength of the second substrate. In some embodiments, in a stretching process of a current collector specimen, the material enters a hardening stage after a yielding stage. As a cross section tapers significantly in size, a maximum force Fb is withstood by the material when the material snaps off. The maximum force is divided by an original cross-sectional area of the specimen to obtain a stress, which is called a tensile strength or a strength limit Rm, measured in MPa. The tensile strength represents the maximum capability of the material to resist crushing under a tensile force. A calculation formula is:

$$Rm=Fb/So$$

In the formula above, Fb is the maximum force withstood by the specimen when the specimen snaps off, measured in N (Newton); So is the original cross-sectional area of the specimen, measured in mm². The tensile strength is usually measured by a universal material testing machine.

Figure 5:
FIG. 5 is a top view of a current collector according to some embodiments of this application.

In some embodiments, the active material layer 102 expands during cycling, thereby generating a stress. When withstanding the stress, the second substrate 112 with a relatively low tensile strength may elongate to some extent in the X direction and the Y direction (as shown in FIG. 5) that are perpendicular to each other in a plane coordinate system thereof. To be specific, the second substrate 112 may expand together with the active material layer 102, thereby suppressing the peel-off or detachment of the active material layer 102. When the first substrate 111 withstands the stress caused by the expansion of the active material layer 102, the tensile strength of the first substrate 111 is relatively high, and therefore, can alleviate the elongation deformation of the first electrode plate 10. Therefore, the current collector 101 according to this application can suppress both the elongation deformation of the first electrode plate 10 and the detachment of the active material layer 102.

In some embodiments, if a difference between the tensile strength $Rm_1$ of the first substrate 111 and the tensile strength $Rm_2$ of the second substrate 112 is exceptionally small, the tensile strength $Rm_1$ of the first substrate 111 is exceptionally low or the tensile strength $Rm_2$ of the second substrate 112 is exceptionally high. The exceptionally low tensile strength $Rm_1$ of the first substrate 111 makes it difficult for the first substrate 111 to suppress the elongation deformation of the first electrode plate 10. The exceptionally high tensile strength $Rm_2$ of the second substrate 112 frustrates the second substrate 112 in suppressing the detachment of the active material layer 102. On the other hand, if the difference between the tensile strength $Rm_1$ of the first substrate 111 and the tensile strength $Rm_2$ of the second substrate 112 is exceptionally large, the tensile strength $Rm_1$ of the first substrate 111 is exceptionally high or the tensile strength $Rm_2$ of the second substrate 112 is exceptionally low. The exceptionally high tensile strength $Rm_1$ of the first substrate 111 impairs the effect of the second substrate 112 in improving the detachment of the active material layer 102. The exceptionally low tensile strength $Rm_2$ of the second substrate 112 makes the second substrate 112 detach from the first substrate 111 together with the active material layer 102.

In some embodiments, a thickness $d_1$ of the first substrate 111 and a thickness $d_2$ of the second substrate 112 satisfy: 0.5≤$d_1/d_2$≤2.5. In some embodiments, the thickness of the material is relatively related to the tensile strength of the material. In order to obtain an appropriate difference between the tensile strength $Rm_1$ of the first substrate 111 and the tensile strength $Rm_2$ of the second substrate 112, the thickness $d_1$ of the first substrate 111 and the thickness $d_2$ of the second substrate 112 are controlled to satisfy: 0.5≤$d_1/d_2$≤2.5.

In some embodiments, 400 MPa≤$Rm_1$≤1000 MPa, and 1 MPa≤$Rm_2$≤600 MPa. In some embodiments, if the tensile strength $Rm_1$ of the first substrate 111 is exceptionally low, the first substrate 111 is relatively restricted from suppressing the elongation deformation of the first electrode plate 10. If the tensile strength $Rm_1$ of the first substrate 111 is exceptionally high, the second substrate 112 will be less effective in suppressing the detachment of the active material layer 102. In some embodiments, if the tensile strength $Rm_2$ of the second substrate 112 is exceptionally low, in order to fit with the first substrate 111, the tensile strength $Rm_1$ of the first substrate 111 usually needs to be relatively low, so that the first substrate 111 is less effective in suppressing the elongation deformation of the first electrode plate 10. If the tensile strength $Rm_2$ of the second substrate 112 is exceptionally high, the second substrate 112 will be hardly effective in suppressing the detachment of the active material layer 102.

In some embodiments, the first substrate 111 includes at least one of an alloy material, an inorganic ceramic material, a calendered copper foil, an electrodeposited nickel foil, or a calendered nickel foil. In some embodiments, the alloy material includes stainless steel. Such materials can provide the first substrate 111 with an appropriate tensile strength $Rm_1$. The calendered copper foil is usually a product (typically, 4 μm to 100 μm in thickness, and less than 800 mm in width) made by repeatedly calendering and annealing high-precision copper strips (usually less than 150 μm in thickness) based on plastic deformation principles. The ductility, bending resistance, and electrical conductivity of the calendered copper foil are higher than those of the electrodeposited copper foil, and the copper purity of the calendered copper foil is also higher than that of the electrodeposited copper foil.

In some embodiments, the second substrate 112 includes at least one of a porous copper foil, an electrodeposited copper foil, a foamed copper foil, or a conductive polymer material. In some embodiments, the conductive polymer material includes a conductive agent and a polymer material. In some embodiments, the conductive agent includes a carbon material. In some embodiments, the polymer material includes at least one of polyethylene, polypropylene, polystyrene, epoxy resin, or phenol resin. Such materials of the second substrate 112 can provide the second substrate 112 with an appropriate tensile strength $Rm_2$. In some embodiments, the electrodeposited copper foil is usually formed by depositing copper ions from the electrolytic solution onto a smooth circular rotating cathode drum made of stainless steel (or titanium). The porous copper foil is usually a copper foil material characterized by a three-dimensional porous structure, and possesses a huge surface area. On the one hand, the porous copper foil can carry a larger amount of active material, thereby increasing the capacity of the electrochemical device. On the other hand, the porous copper foil can provide a larger reaction interface for electrode reaction to increase the power of the electrochemical device. The foamed copper foil is usually a versatile material with a copper matrix in which a large number of communicating or non-communicating holes are distributed homogeneously. The foamed copper is highly conductive and ductile, and is more cost-effective and more conductive than foamed nickel.

Figure 2:
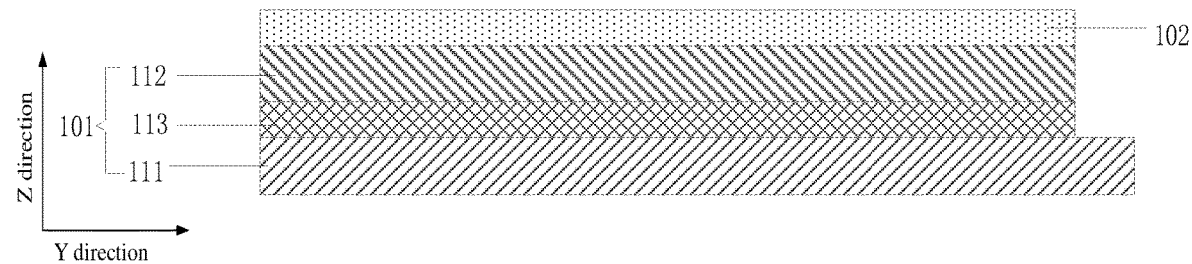
FIG. 2 is a schematic diagram of a first electrode plate sectioned along a plane defined by a thickness direction and a width direction of a current collector according to some embodiments of this application.

In some embodiments, the first substrate 111 and the second substrate 112 may be compounded together in any manner as appropriate, including but not limited to calendering, electrodeposition, evaporation, and bonding. For example, in some embodiments, as shown in FIG. 2, the current collector 101 further includes a first bonding layer 113. The first bonding layer 113 is configured to bond the first substrate 111 and the second substrate 112.

In some embodiments, the elongation rate of the first substrate 111 is less than or equal to 25%, and the elongation rate of the second substrate 112 is less than or equal to 25%. If the elongation rate of the first substrate 111 or the second substrate 112 is exceptionally high, the first electrode plate 10 is prone to stretch and deform.

In this application, the elongation rate is a percentage of a maximum extension length of a substrate sample in a gauge length of an original substrate sample after the substrate sample is snapped off under tension in a tensile test. To be specific, the original gauge length of the substrate sample is L1, the maximum extension length of the substrate sample snapped off under tension is L2, and the elongation rate is $\varepsilon = L2 \times 100\%/L1$.

In some embodiments, in a thickness direction (Z direction, perpendicular to the X and Y directions of the first electrode plate 10 or the current collector 101) of the first electrode plate 10, a projection of the active material layer 102 is located within a region of a projection of the second substrate 112. In other words, the active material layer 102 does not directly contact the first substrate 111. In this way, the second substrate 112 can effectively alleviate the detachment of the active material layer 102, and prevent the active material layer 102 from detaching due to direct contact between the active material layer 102 and the first substrate 111. That is because the tensile strength of the first substrate 111 is relatively high, and the active material layer 102 is prone to be dislocated and peeled off from the directly contacted first substrate 111 when expanding during cycling.

In some embodiments, a total thickness of the first substrate 111 and the second substrate 112 is 4 μm to 20 μm. If the total thickness of the first substrate 111 and the second substrate 112 is exceptionally small, it may be difficult to exert the effects of suppressing the elongation deformation of the first electrode plate 10 and the detachment of the active material layer 102. If the total thickness of the first substrate 111 and the second substrate 112 is exceptionally large, the enhancement of the energy density of the electrochemical device will be adversely affected.

In some embodiments, the active material layer 102 includes a negative active material. The negative active material includes a silicon-based material. The silicon-based material includes at least one of silicon, a silicon alloy, an oxide of silicon, or a silicon-carbon composite. Such silicon-based materials exhibit a relatively high expansion rate (up to 300%) during cycling. The current collector according to this application can alleviate the problem of expansion of the active material layer including the silicon-based materials.

Figure 3:
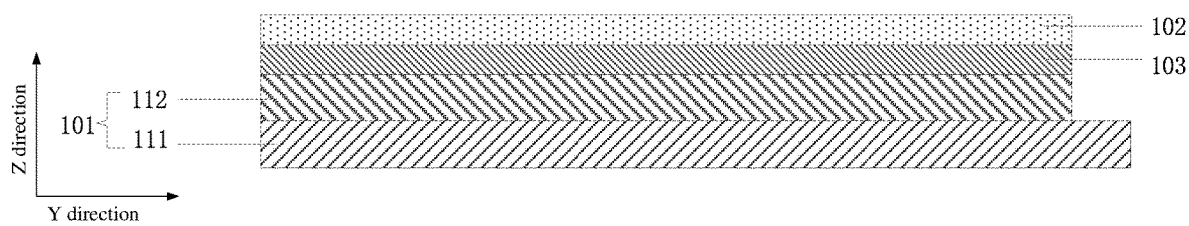
FIG. 3 is a schematic diagram of a first electrode plate sectioned along a plane defined by a thickness direction and a width direction of a current collector according to some embodiments of this application.

In some embodiments, as shown in FIG. 1, the active material layer 102 contacts the second substrate 112. In some embodiments, as shown in FIG. 3, the first electrode plate may further include a conductive layer 103 disposed between the active material layer 102 and the second substrate 112. The conductive layer 103 contacts both the active material layer 102 and the second substrate 112. In some embodiments, the conductive layer 103 includes a carbon material and a binder. The binder may include at least one of a polyvinylidene difluoride, a vinylidene difluoride-hexafluoropropylene copolymer, polyamide, polyacrylonitrile, polyacrylic ester, polyacrylic acid, polyacrylic acid sodium salt, sodium carboxymethyl cellulose, polyvinylpyrrolidone, polyvinyl ether, polymethyl methacrylate, polytetrafluoroethylene, or polyhexafluoropropylene. In some embodiments, a mass ratio between the carbon material and the binder in the conductive layer 103 may be (70 to 90):(10 to 30). In some embodiments, the carbon material may include at least one of carbon fiber, carbon nanotubes, graphene, or conductive carbon black. Understandably, what is enumerated above is merely exemplary, and the conductive layer 103 may include other appropriate materials combined at other appropriate mass ratios.

Figure 4:
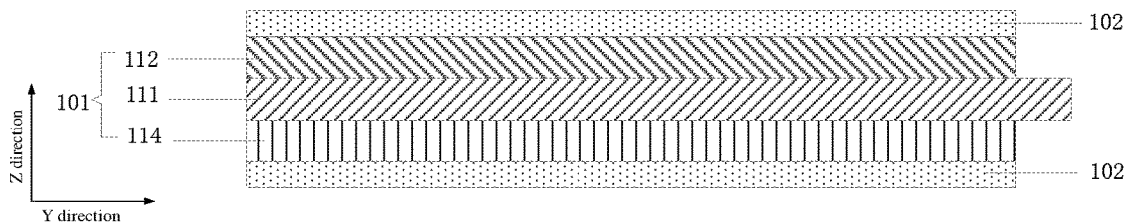
FIG. 4 is a schematic diagram of a first electrode plate sectioned along a plane defined by a thickness direction and a width direction of a current collector according to some embodiments of this application.

In some embodiments, as shown in FIG. 4, the current collector 101 further includes a third substrate 114. The third substrate 114 is stacked along with the first substrate 111. The first substrate 111 is disposed between the third substrate 114 and the second substrate 112. The active material layer 102 is further disposed on the third substrate 114. And 100 MPa≤$Rm_1$−$Rm_3$≤400 MPa, $Rm_1$ is the tensile strength of the first substrate 111 and $Rm_3$ is a tensile strength of the third substrate 114. In some embodiments, the third substrate 114 may include the same material as the second substrate 112, so that the current collector 101 forms a sandwich structure. Alternatively, the third substrate 114 may include a material different from the second substrate 112. And 100 MPa≤$Rm_1$−$Rm_3$≤400 MPa, $Rm_1$ is the tensile strength of the first substrate 111 and $Rm_3$ is a tensile strength of the third substrate 114, thereby suppressing the elongation deformation of the first electrode plate 10 and the detachment of the active material layer 102 disposed on the third substrate 114, details of which are omitted here because reference may be made to the description about the coordination between the first substrate 111 and the second substrate 112.

In some embodiments, the electrochemical device further includes a tab connected to the first substrate 111 or the second substrate 112 of the first electrode plate 10. A thickness of the first substrate 111 or the second substrate 112 connected to the tab is greater than or equal to 3 μm. When the thickness of the first substrate 111 or the second substrate 112 is greater than or equal to 3 μm, the welding of the tab is facilitated and stability of the welded structure is ensured, thereby ensuring stable performance of the electrochemical device. In some embodiments, the thickness of the first substrate 111 or the second substrate 112 connected to the tab is less than or equal to 10 µm. If the thickness is exceptionally large, the enhancement of the energy density of the electrochemical device will be adversely affected.

In some embodiments, the first substrate 111 may be conductive or non-conductive. In some embodiments, when the tab is connected to the first substrate 111, the first substrate 111 is conductive. In some embodiments, the first substrate 111, the second substrate 112, and the third substrate 114 each may independently be a single-layer substrate or a multi-layer composite of different materials.

In some embodiments, when the first electrode plate 10 is a positive electrode, the current collector 101 is a positive current collector, and the active material layer 102 is a positive active material layer. In some embodiments, the positive active material layer includes a positive active material. The positive active material includes at least one of lithium cobalt oxide, lithium iron phosphate, lithium manganese oxide, lithium nickel cobalt manganese oxide, or lithium nickel manganese oxide. In some embodiments, the positive active material layer may further include a conductive agent. In some embodiments, the conductive agent in the positive active material layer may include at least one of conductive carbon black, Ketjen black, graphite flakes, graphene, carbon nanotubes, or carbon fiber. In some embodiments, the positive active material layer may further include a binder. The binder in the positive active material layer may include at least one of carboxymethyl cellulose (CMC), polyacrylic acid, polyvinylpyrrolidone, polyaniline, polyimide, polyamideimide, polysiloxane, styrene butadiene rubber, epoxy resin, polyester resin, polyurethane resin, or polyfluorene. In some embodiments, a mass ratio of the positive active material, the conductive agent, and the binder in the positive active material layer may be (78 to 99):(0.1 to 10):(0.1 to 10). In some embodiments, the thickness of the positive active material layer may be 10 µm to 200 µm. Understandably, what is described above is merely an example, and the positive active material layer of the positive electrode may adopt any other appropriate material, thickness, and mass ratio.

In some embodiments, the positive current collector of the positive electrode may be an aluminum foil, or may be another type of current collector commonly used in the art. In some embodiments, the thickness of the positive current collector of the positive electrode may be 1 µm to 200 µm. In some embodiments, the positive active material layer may be coated on merely a partial region of the positive current collector of the positive electrode.

In some embodiments, when the first electrode plate 10 is a negative electrode, the current collector 101 is a negative current collector, and the active material layer 102 is a negative active material layer. In some embodiments, the negative active material may include at least one of graphite, hard carbon, silicon, silicon suboxide, or organosilicon. In some embodiments, the negative active material layer may further include a conductive agent and a binder. In some embodiments, the conductive agent in the negative active material layer may include at least one of conductive carbon black, Ketjen black, graphite flakes, graphene, carbon nanotubes, or carbon fiber. In some embodiments, the binder in the negative active material layer may include at least one of carboxymethyl cellulose (CMC), polyacrylic acid, polyvinylpyrrolidone, polyaniline, polyimide, polyamideimide, polysiloxane, styrene butadiene rubber, epoxy resin, polyester resin, polyurethane resin, or polyfluorene. In some embodiments, a mass ratio between the negative active material, the conductive agent, and the binder in the negative active material layer may be (78 to 98.5):(0.1 to 10):(0.1 to 10). Understandably, what is enumerated above is merely an example, and any other appropriate material and mass ratio may apply. In some embodiments, the negative current collector of the negative electrode may be at least one of a copper foil, a nickel foil, or a carbon-based current collector.

In some embodiments, the electrochemical device may further include a separator disposed between the positive electrode and the negative electrode. In some embodiments, the separator includes at least one of polyethylene, polypropylene, polyvinylidene fluoride, polyethylene terephthalate, polyimide, or aramid fiber. For example, the polyethylene includes at least one of high-density polyethylene, low-density polyethylene, or ultra-high-molecular-weight polyethylene. Especially the polyethylene and the polypropylene are highly effective in preventing short circuits, and improve stability of the battery through a turn-off effect. In some embodiments, the thickness of the separator is within a range of approximately 5 µm to 500 µm.

In some embodiments, a porous layer may be further included in a surface of the separator. The porous layer is disposed on at least one surface of a substrate of the separator. The porous layer includes inorganic particles and a binder. The inorganic particles is at least one selected from aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), ceria ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, or barium sulfate. In some embodiments, a diameter of a pore of the separator is within a range of approximately 0.01 µm to 1 µm. The binder in the porous layer is at least one selected from polyvinylidene difluoride, a vinylidene difluoride-hexafluoropropylene copolymer, a polyamide, polyacrylonitrile, polyacrylic ester, polyacrylic acid, sodium polyacrylate, sodium carboxymethyl cellulose, polyvinylpyrrolidone, polyvinyl ether, poly methyl methacrylate, polytetrafluoroethylene, or polyhexafluoropropylene. The porous layer on the surface of the separator can improve heat resistance, oxidation resistance, and electrolyte infiltration performance of the separator, and enhance adhesion between the separator and the electrode plate.

In some embodiments of this application, the electrode assembly of the electrochemical device is a jelly-roll electrode assembly, a stacked electrode assembly, or a folded electrode assembly. In some embodiments, the positive electrode and/or negative electrode of the electrochemical device may be a multi-layer structure formed by winding or stacking, or may be a single-layer structure formed by stacking a single layer of positive electrode, a separator, and a single layer of negative electrode.

In some embodiments, the electrochemical device includes, but is not limited to, a lithium-ion battery. In some embodiments, the electrochemical device may further include an electrolyte. The electrolyte may be one or more of a gel electrolyte, a solid-state electrolyte, and an electrolytic solution. The electrolytic solution includes a lithium salt and a nonaqueous solvent. The lithium salt is one or more selected from $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, the lithium salt is $LiPF_6$ because it is of a high ionic conductivity and can improve cycle characteristics.

The nonaqueous solvent may be a carbonate compound, a carboxylate compound, an ether compound, another organic solvent, or any combination thereof.

The carbonate compound may be a chain carbonate compound, a cyclic carbonate compound, a fluorocarbonate compound, or any combination thereof.

Examples of the chain carbonate compound are diethyl carbonate (DEC), dimethyl carbonate (DMC), dipropyl carbonate (DPC), methyl propyl carbonate (MPC), ethylene propyl carbonate (EPC), ethyl methyl carbonate (EMC), or any combination thereof. Examples of the cyclic carbonate compound are ethylene carbonate (EC), propylene carbonate (PC), butylene carbonate (BC), vinyl ethylene carbonate (VEC), or any combination thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methyl ethylene, 1-fluoro-1-methyl ethylene carbonate, 1,2-difluoro-1-methyl ethylene carbonate, 1,1,2-trifluoro-2-methyl ethylene carbonate, trifluoromethyl ethylene carbonate, or any combination thereof.

Examples of the carboxylate compound are methyl acetate, ethyl acetate, n-propyl acetate, tert-butyl acetate, methyl propionate, ethyl propionate, propyl propionate, γ-butyrolactone, decanolactone, valerolactone, mevalonolactone, caprolactone, methyl formate, or any combination thereof.

Examples of the ether compound are dibutyl ether, tetraglyme, diglyme, 1,2-dimethoxyethane, 1,2-diethoxyethane, ethoxy-methoxyethane, 2-methyltetrahydrofuran, tetrahydrofuran, or any combination thereof.

Examples of the other organic solvent are dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or any combination thereof.

In some embodiments of this application, using a lithium-ion battery as an example, the lithium-ion battery is prepared by: winding or stacking the positive electrode, the separator, and the negative electrode sequentially into an electrode assembly, putting the electrode assembly into a package such as an aluminum plastic film ready for sealing, injecting an electrolytic solution, and performing chemical formation and sealing; Then a performance test is performed on the prepared lithium-ion battery.

A person skilled in the art understands that the method for preparing the electrochemical device (for example, the lithium-ion battery) described above is merely an example. To the extent not departing from the content disclosed herein, other methods commonly used in the art may be used.

An embodiment of this application further provides an electronic device containing the electrochemical device. The electronic device according to the embodiments of this application is not particularly limited, and may be any electronic device known in the prior art. In some embodiments, the electronic device may include, but is not limited to, a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

Some specific embodiments and comparative embodiments are enumerated below to give a clearer description of this application, in which a lithium-ion battery is used as an example. For brevity, a negative electrode is used as an example of the first electrode plate. However, a positive electrode may also adopt the structure of the first electrode plate.

Comparative Embodiment 1

Preparing a positive electrode: Using an aluminum foil as a positive current collector of the positive electrode, and dissolving lithium cobalt oxide as a positive active material, conductive carbon black as a conductive agent, and polyvinylidene difluoride at a mass ratio of 97.8:1.4:0.8 in an N-methyl-pyrrolidone (NMP) solution to form a positive active material layer slurry. Coating the positive current collector with the slurry that is 80 μm thick to obtain a positive active material layer. Performing drying, cold pressing, and cutting to obtain a positive electrode.

Preparing a negative electrode: Dissolving artificial graphite, a silicon oxide (SiO), sodium carboxymethyl cellulose (CMC), and the binder styrene butadiene rubber at a mass ratio of 82.7:15:1.3:1 in deionized water to form a negative slurry. Using a single-layer 4 μm-thick electrodeposited copper foil (with a tensile strength of 380 MPa) as a negative current collector, and coating both sides of the negative current collector with the negative slurry to obtain two negative active material layers, where the mass percent of silicon in each negative active material layer is 15%. Performing drying and cutting to obtain a negative electrode.

Preparing a separator: Using 8 μm-thick polyethylene (PE) as a substrate of the separator, coating both sides of the substrate of the separator with a 2 μm-thick aluminum oxide ceramic layer. Finally, coating polyvinylidene difluoride (PVDF) as a binder in an amount of 2.5 mg/cm$^2$ onto both sides that have been coated with the ceramic layer, and performing drying.

Preparing an electrolytic solution: Adding LiPF$_6$ into a nonaqueous organic solvent in an environment in which a water content is less than 10 ppm, where the mass ratio between ingredients of the nonaqueous organic solvent is ethylene carbonate (EC):propylene carbonate (PC)=50:50, and the concentration of the LiPF$_6$ is 1.15 mol/L. Mixing the solution evenly to obtain an electrolytic solution.

Preparing a lithium-ion battery: Stacking the positive electrode, the separator, and the negative electrode sequentially so that the separator is located between the positive electrode and the negative electrode to serve a function of separation, and winding the stacked plates to obtain an electrode assembly. Putting the electrode assembly in an aluminum plastic film that serves as an outer package, dehydrating the electrode assembly under 80° C., injecting the electrolytic solution, and performing sealing; and performing steps such as chemical formation, degassing, and edge trimming to obtain a lithium-ion battery.

In Comparative Embodiment 2, the negative current collector is a 4 μm-thick electrodeposited nickel foil. Other parameters are the same as those in Comparative Embodiment 1.

In Comparative Embodiment 3, the second substrate of the negative current collector is an 8 μm-thick conductive styrene with a tensile strength of 146 MPa, and the first substrate is an 8 μm-thick calendered copper foil with a tensile strength of 620 MPa. Compounding the second substrate on both sides of the first substrate by performing hot pressing at a temperature of 80° C. under a pressure of 1.5 MPa. Subsequently, coating both sides of the negative current collector with the negative active material that contains 15 wt % silicon.

In Comparative Embodiments 4 to 7 and Embodiments 1 to 7, just the composition of the negative current collector is different from that in Comparative Embodiment 3. For other parameters, see Comparative Embodiment 3. In Embodiments 8 to 10, just the composition of the negative current collector and the silicon content in the negative active material layer are different from those in Comparative Embodiment 3. For other parameters, see Comparative Embodiment 3.

The following describes the testing method of each parameter in this application.

Testing the elongation rate of the electrode plate:

When fully charged, the lithium-ion battery expands in the X-Y and Z directions. The current collector elongates in the X-Y direction under the expansion force of the electrode plate. In a length direction of the electrode plate (X direction), picking 2 samples from a head part, a middle part, a tail part, and an empty foil region of the electrode plate respectively (a region of the current collector, coated with the active material layer), and pasting the samples onto a glass sheet. Isolating air with transparent adhesive tape, and then measuring the width of the electrode plate with a charge-coupled device (CCD). Theoretically, benchmarked against zero elongation of the empty foil region, elongation of the fully charged battery in the X-Y direction=width of the electrode plate in the full-charge region/width in the empty foil region−1. Averaging out the results of the six samples to obtain the X-Y elongation rate. The X-Y elongation rate can reflect the deformation of the material to some extent.

Testing the tensile strength and the elongation rate:

A prevalent method for measuring the tensile strength in China is to measure the tensile/compressive strength by using a universal material testing machine. The specific test steps are as follows:

(1) Cutting out 5 strips of current collector specimens that each are 15 mm in width and 200 mm in length from a horizontal direction and a vertical direction of the samples separately by using a sampler.

(2) Clamping two ends of each specimen at an upper chuck and a lower chuck of the testing machine respectively. The long axis direction of the specimen coincides with the center line of the upper and lower chucks.

(3) Setting the test speed, the specimen width, and other parameter information.

(4) Clicking the "Start test" option to start the test.

(5) The testing machine automatically calculates and displays the final test results.

In the test, the tensile strength (Rm) is a stress obtained by: a maximum force Fb withstood by the current collector specimen during stretching, divided by an original cross-sectional area of the specimen, measured in MPa.

Detachment Test:

The detachment is usually tested through visual observation. After the electrode plate incurs detachment, stratification is evident. The electrode plate is prone to fall off after being touched, and the current collector is wrinkled to some extent.

Table 1 shows parameters and evaluation results in Embodiments 1 to 10 and Comparative Embodiments 1 to 7.

TABLE 1

| | Silicon content | Second substrate | Thickness of second substrate (μm) | Tensile strength of second substrate (MPa) | First substrate | Thickness of first substrate (μm) | Tensile strength of first substrate (MPa) | Tensile strength difference (MPa) | Ratio of thickness between first substrate and second substrate | Elongation rate | Detached |
|---|---|---|---|---|---|---|---|---|---|---|---|
| Comparative Embodiment 1 | 15% | Electrodeposited copper foil | 4 | 380 | / | / | / | / | / | 2.56 | No |
| Comparative Embodiment 2 | 15% | / | / | / | Electrolytic nickel foil | 4 | 660 | / | / | 0.19 | Yes |
| Comparative Embodiment 3 | 15% | Conductive styrene | 8 | 146 | Calendered copper foil | 8 | 620 | 474 | 1.00 | 0.24 | Yes |
| Comparative Embodiment 4 | 15% | Electrodeposited copper foil | 8 | 560 | Calendered copper foil | 8 | 620 | 60 | 1.00 | 0.21 | Yes |
| Comparative Embodiment 5 | 15% | Electrodeposited copper foil | 10 | 597 | Electrolytic nickel foil | 4 | 660 | 63 | 0.40 | 0.19 | Yes |
| Comparative Embodiment 6 | 15% | Conductive styrene | 12 | 173 | Electrolytic nickel foil | 4 | 660 | 487 | 0.33 | 0.24 | Yes |
| Comparative Embodiment 7 | 15% | Conductive styrene | 3 | 73 | Calendered copper foil | 8 | 620 | 547 | 2.67 | 0.28 | Yes |
| Embodiment 1 | 15% | Electrodeposited copper foil | 4 | 380 | Electrolytic nickel foil | 4 | 660 | 280 | 1.00 | 0.3 | No |
| Embodiment 2 | 15% | Electrodeposited copper foil | 4 | 380 | Calendered copper foil | 6 | 520 | 140 | 1.50 | 0.33 | No |
| Embodiment 3 | 15% | Porous copper foil | 9 | 240 | Calendered copper foil | 8 | 620 | 380 | 0.89 | 0.31 | No |
| Embodiment 4 | 15% | Electrodeposited copper foil | 5 | 450 | Stainless steel | 5 | 800 | 350 | 1.00 | 0.21 | No |
| Embodiment 5 | 15% | Electrodeposited copper foil | 5 | 450 | Electrolytic nickel foil | 4 | 660 | 210 | 0.80 | 0.23 | No |
| Embodiment 6 | 15% | Foamed copper foil | 6 | 230 | Calendered copper foil | 8 | 620 | 390 | 1.33 | 0.31 | No |
| Embodiment 7 | 15% | Conductive styrene | 12 | 173 | Calendered copper foil | 6 | 520 | 347 | 0.50 | 0.45 | No |
| Embodiment 8 | 25% | Electrodeposited copper foil | 4 | 380 | Calendered copper foil | 6 | 520 | 140 | 1.50 | 0.42 | No |

TABLE 1-continued

|  | Silicon content | Second substrate | Thickness of second substrate (μm) | Tensile strength of second substrate (MPa) | First substrate | Thickness of first substrate (μm) | Tensile strength of first substrate (MPa) | Tensile strength difference (MPa) | Ratio of thickness between first substrate and second substrate | Elongation rate | Detached |
|---|---|---|---|---|---|---|---|---|---|---|---|
| Embodiment 9 | 25% | Electrodeposited copper foil | 5 | 450 | Calendered copper foil | 8 | 620 | 170 | 1.60 | 0.33 | No |
| Embodiment 10 | 35% | Electrodeposited copper foil | 5 | 450 | Calendered copper foil | 8 | 620 | 170 | 1.60 | 0.43 | No |

"/" means none (the same applies below).

As can be seen from comparison between Embodiment 1 and Comparative Embodiments 1 and 2, compared with a single-layer current collector, the current collector containing the first substrate and the second substrate can significantly reduce the elongation rate of the electrode plate and suppress the detachment in the electrode plate.

As can be seen from comparison between Embodiment 2 and Comparative Embodiments 3 to 4, when the tensile strength difference between the first substrate and the second substrate is less than 100 MPa or greater than 400 MPa, the detachment occurs in the electrode plate although the elongation rate of the electrode plate is reduced due to the use of the first substrate with a high tensile strength.

As can be seen from comparison between Embodiment 7 and Comparative Embodiments 5 to 7, when the ratio of thickness between the first substrate and the second substrate is less than 0.5 or greater than 2.5, the detachment occurs in the electrode plate.

As can be seen from comparison between Embodiments 1 to 10, the composite current collectors with various structures can reduce the elongation rate and suppress the detachment in the electrode plate when the tensile strength difference between the first substrate and the second substrate is 100 MPa to 400 MPa.

As can be seen from comparison between Embodiments 8 and 9, a relatively thick current collector can reduce the elongation rate of the electrode plate.

As can be seen from comparison between Embodiments 9 and 10, as the silicon content of the negative active material layer increases, the elongation rate of the electrode plate increases accordingly.

The foregoing descriptions are merely about exemplary embodiments of this application and the technical principles applied. A person skilled in the art understands that the scope of disclosure in this application is not limited to the technical solutions formed by a specific combination of the foregoing technical features, but also covers other technical solutions formed by arbitrarily combining the foregoing technical features or equivalents thereof, for example, a technical solution formed by replacing any of the foregoing features with a technical feature disclosed herein and serving similar functions.

The invention claimed is:

1. An electrochemical device, comprising a first electrode plate, wherein the first electrode plate comprises:
   a current collector comprising a first substrate and a second substrate that are stacked together;
   an active material layer, wherein the second substrate is disposed between the first substrate and the active material layer; and
   100 MPa≤$Rm_1$−$Rm_2$≤400 MPa, wherein $Rm_1$ is a tensile strength of the first substrate and $Rm_2$ is a tensile strength of the second substrate.

2. The electrochemical device according to claim 1, wherein 0.5≤$d_1$/$d_2$≤2.5, $d_1$ is a thickness of the first substrate and $d_2$ is a thickness of the second substrate.

3. The electrochemical device according to claim 1, wherein 400 MPa≤$Rm_1$≤1000 MPa, and 1 MPa≤$Rm_2$≤600 MPa.

4. The electrochemical device according to claim 1, wherein the first substrate comprises at least one of an alloy material, an inorganic ceramic material, a calendered copper foil, an electrodeposited nickel foil, or a calendered nickel foil.

5. The electrochemical device according to claim 1, wherein the second substrate comprises at least one of a porous copper foil, an electrodeposited copper foil, a foamed copper foil, or a conductive polymer material; and
   the conductive polymer material comprises a conductive agent and a polymer material, the conductive agent comprises a carbon material, and the polymer material comprises at least one of polyethylene, polypropylene, polystyrene, epoxy resin, or phenol resin.

6. The electrochemical device according to claim 1, wherein the current collector further comprises a first bonding layer, and the first bonding layer is disposed between the first substrate and the second substrate, and is configured to bond the first substrate and the second substrate.

7. The electrochemical device according to claim 1, wherein an elongation rate of the first substrate is less than or equal to 25%, and an elongation rate of the second substrate is less than or equal to 25%.

8. The electrochemical device according to claim 1, wherein, in a thickness direction of the first electrode plate, a projection of the active material layer is located within a region of a projection of the second substrate.

9. The electrochemical device according to claim 1, wherein a total thickness of the first substrate and the second substrate is 4 μm to 20 μm.

10. The electrochemical device according to claim 1, wherein the active material layer comprises a negative active material, the negative active material comprises a silicon-based material, and the silicon-based material comprises at least one of silicon, a silicon alloy, an oxide of silicon, or a silicon-carbon composite.

11. The electrochemical device according to claim 1, wherein
   the active material layer contacts the second substrate; or
   the first electrode plate further comprises a conductive layer disposed between the active material layer and the second substrate, and the conductive layer contacts both the active material layer and the second substrate.

12. The electrochemical device according to claim 1, wherein the current collector further comprises a third substrate, the third substrate is stacked along with the first substrate, the first substrate is disposed between the third substrate and the second substrate, the active material layer is further disposed on the third substrate, and 100 MPa≤$Rm_1$−$Rm_3$≤400 MPa, $Rm_1$ is the tensile strength of the first substrate and $Rm_3$ is a tensile strength of the third substrate.

13. The electrochemical device according to claim 1, wherein the electrochemical device further comprises a tab connected to the first substrate or the second substrate of the first electrode plate, and a thickness of the first substrate or the second substrate connected to the tab is greater than or equal to 3 μm.

14. An electronic device, comprising an electrochemical device, the electrochemical device comprises a first electrode plate, wherein the first electrode plate comprising:
    a current collector comprising a first substrate and a second substrate that are stacked together; and
    an active material layer, wherein the second substrate is disposed between the first substrate and the active material layer, and 100 MPa≤$Rm_1$−$Rm_2$≤400 MPa, wherein $Rm_1$ is a tensile strength of the first substrate and $Rm_2$ is a tensile strength of the second substrate.

15. The electronic device according to claim 14, wherein a thickness $d_1$ of the first substrate and a thickness $d_2$ of the second substrate satisfy: 0.5≤$d_1/d_2$≤2.5.

16. The electronic device according to claim 14, wherein 400 MPa≤$Rm_1$≤1000 MPa, and 1 MPa≤$Rm_2$≤600 MPa.

17. The electronic device according to claim 14, wherein the first substrate comprises at least one of an alloy material, an inorganic ceramic material, a calendered copper foil, an electrodeposited nickel foil, or a calendered nickel foil.

18. The electronic device according to claim 14, wherein the second substrate comprises at least one of a porous copper foil, an electrodeposited copper foil, a foamed copper foil, or a conductive polymer material; and
    the conductive polymer material comprises a conductive agent and a polymer material, the conductive agent comprises a carbon material, and the polymer material comprises at least one of polyethylene, polypropylene, polystyrene, epoxy resin, or phenol resin.

19. The electronic device according to claim 14, wherein an elongation rate of the first substrate is less than or equal to 25%, and an elongation rate of the second substrate is less than or equal to 25%.

20. The electronic device according to claim 14, wherein a total thickness of the first substrate and the second substrate is 4 μm to 20 μm.

* * * * *